United States Patent
Kealy et al.

(10) Patent No.: US 6,582,752 B2
(45) Date of Patent: Jun. 24, 2003

(54) METHODS AND COMPOSITIONS FOR A GENDER SPECIFIC DIET FOR PUPPIES

(75) Inventors: Richard D. Kealy, Waterloo, IL (US); David M. Bebiak, Villa Ridge, MO (US)

(73) Assignee: Nestec, LTD, Vevey (CH)

( * ) Notice: Subject to any disclaimer, the term of this patent is extended or adjusted under 35 U.S.C. 154(b) by 0 days.

(21) Appl. No.: 09/682,964

(22) Filed: Nov. 2, 2001

(65) Prior Publication Data

US 2003/0087020 A1 May 8, 2003

(51) Int. Cl.$^7$ .................................................. A23K 1/18
(52) U.S. Cl. ........................................ 426/656; 426/805
(58) Field of Search .................................. 426/656, 805

(56) References Cited

U.S. PATENT DOCUMENTS

| | | | |
|---|---|---|---|
| 4,282,254 A | 8/1981 | Franzen et al. | 426/2 |
| 4,296,132 A | 10/1981 | Lazarus et al. | 426/2 |
| 4,598,097 A | 7/1986 | Perry et al. | 514/738 |
| 5,686,490 A | 11/1997 | Okazaki et al. | 514/558 |
| 5,851,573 A * | 12/1998 | Lepine et al. | 426/74 |
| 6,261,591 B1 * | 7/2001 | Kealy | 424/442 |
| 6,358,546 B1 * | 3/2002 | Bebiak et al. | 426/232 |

OTHER PUBLICATIONS

Hirakawa et al., Companion Animal Practice, vol. 2, No. 1, pp. 25–32, 1988.*
Burns et al., Journal of Nutrition, vol. 111(12), pp. 2117–2124, 1981.*
Hirakawa, Da, et al.; 'Comparative Peformance as well as nitrogen & energy requirements of young puppies fed three distinctly different experimental dog foods & one commercial product.' Companion Animal Practice, 1988, vol. 2, No. 1, pp. 25–32, CHEMICAL ABSTRACTS, AN 90:5591.
Burns R A, et al., 'Sulfur amino acid requirments of immature Beagle dogs.' Dec. 1981, vol. 111, No. 12, pp. 2117–24. TOXCENTER ABSTRACTS. AN 1982; 12961, PubMed ID: 7310536.

* cited by examiner

Primary Examiner—Chhaya D. Sayala
(74) Attorney, Agent, or Firm—Armstrong Teasdale LLP

(57) ABSTRACT

A gender specific food for puppies is disclosed where the food includes at least about 0.25% methionine by weight and at least about 0.45% total sulfur amino acids. The food further includes a total dietary lipid level based on gender, and for maximizing body weight and length gains, lipid levels and the amounts of methionine are adjusted based upon the gender of the puppy.

39 Claims, 3 Drawing Sheets

Gender Response to Dietary Methionine (I)

|  | Dietary Methionine (%) | | |
|---|---|---|---|
| Number of | 0.31 | 0.34 | 0.41 |
| Females | 37 | 35 | 36 |
| Males | 26 | 25 | 26 |
| Weight Gain: Females (lb.) | 19.4 | 19.1 | 19.5 |
| Males (lb.) ** | 22.0 | 22.9 | 23.8 |
| Length Gain: Females (in.) | 11.1 | 11.0 | 11.2 |
| Males (in.) ** | 11.9 | 12.3 | 12.6 |

** Significant trend within gender

Gender Response to Dietary Methionine (II)

|  | Dietary Methionine (%) | |
|---|---|---|
| Number of | 0.44 | 0.83 |
| Females | 15 | 15 |
| Males | 19 | 19 |
| Weight Gain: Females (lb.) | 21.5 | 21.5 |
| Males (lb.) | 24.5 | 26.4** |
| Length Gain: Females (in.) | 11.4 | 11.6 |
| Males (in.) | 11.8 | 12.0 |

** Significantly different

FIG. 2

Gender Response to Dietary Fat

|  | Dietary Fat (%) | |
|---|---|---|
| Number of | 11.1 | 8.9 |
| Females | 25 | 26 |
| Males | 27 | 25 |
| Weight Gain: Females (lb.) | 18.6** | 17.0 |
| Males (lb.) | 19.4 | 19.8 |
| Length Gain: Females (in.) | 11.5 | 11.5 |
| Males (in.) | 11.4 | 12.0** |

** Significantly different

FIG. 3

METHODS AND COMPOSITIONS FOR A GENDER SPECIFIC DIET FOR PUPPIES

BACKGROUND OF INVENTION

This invention relates generally to food products for pets, and, more particularly, to compositions relating to a gender specific diet for puppies.

While pet care product customers presently have a host of suppliers and products to choose from, it may take significant time, effort, and investigation to determine a product that best suits a particular pet's needs among the available alternatives. This is particularly true in the case of pet foods. While veterinarians and other professionals may assist in recommending a given brand of pet food for a particular pet, pet foods are typically mass manufactured to meet the needs of an average pet within a selected range of pets that is typically based on pet age and/or size. Nutritional needs, however, vary from pet to pet, and an optimal regimen of appropriate nutrients for a particular pet or breed of pet would be beneficial. Nutritional requirements for young pets, such as puppies are especially important as the nutritional intake of a puppy will determine such things as health, size, and appearance as the puppy becomes an adult dog and matures into an older dog.

SUMMARY OF INVENTION

In one aspect, a gender specific food for puppies is provided which comprises at least about 0.25% methionine, at least about 0.45% total sulfur amino acids, and a total dietary lipid level based on gender.

In another aspect, a method for maximizing body weight gain and body length gain in puppies is provided. The method comprises the steps of providing a diet with an amount of methionine and total sulfur amino acids based on a gender of the puppy, and formulating the diet with an amount of dietary calories from fat based on the gender of the puppy.

In still another aspect, a food for male puppies is provided. The male puppy food comprises from about 0.31% to about 0.83% by weight of an amino acid, methionine, as part of an amount of total sulfur amino acids from about 0.50% to about 1.18%. The food further comprises less than about 25% of calories coming from dietary fat.

In yet another aspect, a food for female puppies is provided. The female puppy food comprises from about 0.25% to about 0.35% by weight of an amino acid, methionine, as part of an amount of total sulfur amino acids from about 0.45% to about 0.70%. The food further comprises more than about 25% of calories coming from dietary fat.

A method for increasing body weight gain and body length gain in male puppies is provided in a further aspect and comprises providing a diet including between about 0.31% and about 0.83% by weight of methionine in a total sulfur amino acids amount of about 0.50% to about 1.18% by weight, and formulating the diet with less than about 25% of dietary calories derived from fat.

Finally a method is provided for increasing body weight gain and body length gain in female puppies which comprises providing a diet including an amount of methionine from about 0.25% to about 0.35% by weight in a total sulfur amino acids amount of about 0.45% to about 0.70% by weight, and formulating the diet with more than about 25% of dietary calories derived from fat.

BRIEF DESCRIPTION OF DRAWINGS

FIG. 2 is a table indicating growth patterns by gender for various levels of the amino acid, methionine.

FIG. 3 is a table indicating growth patterns by gender for various levels of dietary fat.

DETAILED DESCRIPTION

Figure 1:
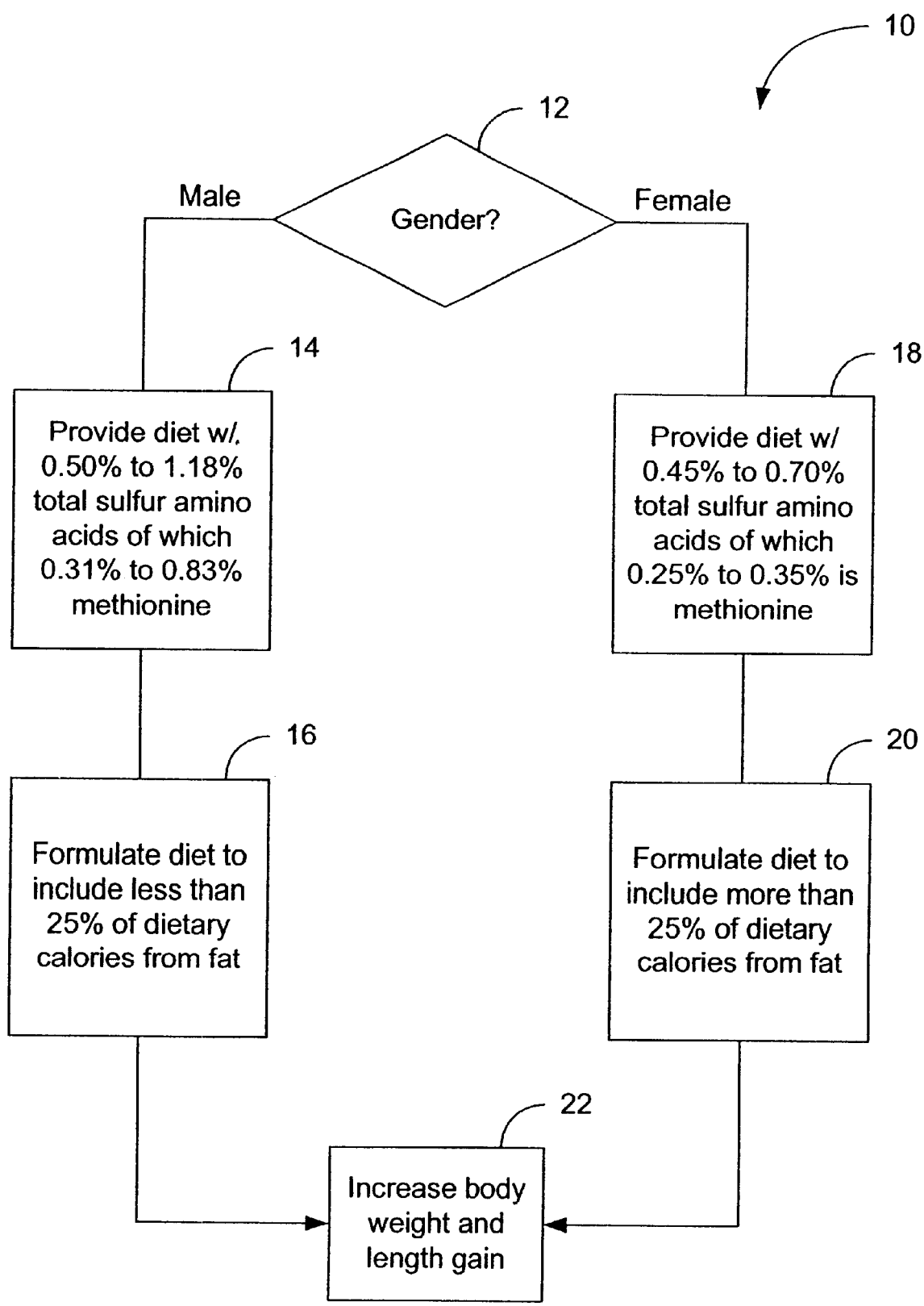
FIG. 1 is a flowchart describing nutrient levels, based on gender.

For growing young pets, for example, puppies, normal growth and development depends, at least in part, on the diet the pet receives. Major nutrient categories are moisture, proteins, fats (lipids), fiber, vitamins and minerals. Receiving these nutrients in a proper balance allows for normal growth and development of the pets. Proteins contain amino acids. Individual amino acids can be increased or lowered within the proteins and are sometimes referred to as affecting the amino acid balance. One such amino acid is a sulfur containing amino acid called methionine.

FIG. 1 is a flowchart 10 showing recommended nutrient levels for puppies based upon the puppy's gender. Referring specifically to flowchart 10, a gender determination is made 12, whereupon nutrient levels are determined by gender. In one embodiment, a male puppy diet is provided 14 which includes from about 0.31% to about 0.83% methionine as part of a total sulfur amino acids volume of about 0.50% to about 1.18%. In an alternative embodiment, a male puppy diet is provided 14 which includes from about 0.41% to about 0.45% methionine as part of a total sulfur amino acids volume of about 0.61% to about 0.80%. In an exemplary embodiment, the diet for male puppies includes 0.45% methionine as part of a total sulfur amino acids concentration of 0.80%. Accompanying the amino acid levels are total dietary lipid level recommendations by gender. For the male puppy, the diet is formulated 16 with less than 25% of dietary calories from fat.

For female puppies, a diet is provided 18 which includes from about 0.25% to about 0.35% methionine as part of a total sulfur amino acids volume of about 0.45% to about 0.70%. In an exemplary embodiment, the diet for female puppies includes about 0.25% to about 0.30% methionine as part of a total sulfur amino acids concentration of about 0.45% to about 0.65%. As with the male puppy diet described above, there is a recommended total dietary lipid level recommendation accompanying the amino acid level. For the female puppy, the diet is formulated 20 with more than 25% of dietary calories from fat. The dietary nutrient values described above are based on a less than 15% moisture basis in the diet.

Adjustment of the amino acid balance and total dietary lipid levels have been shown to increase 22 body weight gain and body length gain, for each gender. The maximized length and weight gains, described below, with respect to the total lipid level intake and methionine level were obtained as when total dietary calorie intakes remained constant.

FIG. 2 is a table 30 summarizing test results, by puppy gender, for varying levels of the amino acid, methionine. For male puppies, increasing the intake of dietary methionine in a range from about 0.31% to about 0.41% produced an average length gain from 11.9 inches to 12.6 inches within a similarly sized sample group. Increasing the dietary intake of methionine from 0.41% to, for example, about 0.44% and about 0.83%, and the total sulfur amino acids from about 0.50% to about 0.80% and about 1.18%, did not result in a significant increase in length gain for the male puppies, over the length gain at 0.41% methionine. Regarding weight gain, as shown in FIG. 2, weight gain steadily increased as the percentage of dietary methionine in the male puppy diet was increased.

Regarding female puppies, increasing the amount of methionine in the diet in the same percentages, that is from a range of about 0.31% to about 0.44% and about 0.83%, and the total sulfur amino acids from about 0.50% to about 0.80% and about 1.18%, neither caused a significant length gain, nor caused a significant weight gain among the female puppy sample groups.

FIG. 3 is a table 40 summarizing test results, by puppy gender, for varying levels of dietary fat in the diet. For female puppies, increasing the intake of dietary fat from 8.9% to 11.1% produced an average weight gain from 17 pounds to 18.6 pounds within a similarly sized sample group. However, in the male puppies, increasing the dietary fat content from 8.9% to 11.1% produced an average length reduction from 12 inches to 11.4 inches.

Increasing dietary fat intake does not result in a significant change in weight gain for the male puppies, nor does changing the dietary fat intake result in significant changes in length gain for the female puppies.

As shown by the test results in FIGS. 2 and 3, the combination of higher methionine in the dietary intake of amino acids, along with a decrease in the amount of dietary calories derived from fat in male puppies in contrast to normal methionine and higher caloric intake of fat for female puppies provides for enhanced development of those body systems that are unique by puppy gender.

In an exemplary embodiment, the dog food compositions for the gender specific diets as described herein further generally includes a nutritionally balanced mixture of proteinaceous and farinaceous ingredients, based on the assumption that the composition provides substantially the sole food intake for the dog. The dog food composition is not intended to be restricted to a specific listing of ingredients since such a listing is largely dependent on the desired nutritional balance of the dog food ration and also on the availability of ingredients to the manufacturer. In addition to the proteinaceous and farinaceous materials described above, the dog food composition generally may include vitamins, minerals, and other additives such as preservatives, emulsifiers and humectants. The nutritional balance, including for example the relative proportions of vitamins, minerals, fat, protein and carbohydrate, is determined according to dietary standards known in the nutrition art.

In certain embodiments, the proteinaceous ingredients are used to supply all or at least some of the methionine and total sulfur amino acids levels as described above. The proteinaceous material may include any material having a protein content of about 20% to about 50% by weight including vegetable proteins such as soybean, cotton seed, and peanut; animal proteins such as casein, albumin, and meat tissue including fresh meat; and dried or rendered meals such as fish meal, poultry meal, meat meal, bone meal and the like. Other types of suitable proteinaceous materials include wheat gluten or corn gluten, and microbial proteins such as yeast. The minimum protein content of the food is varied according to the age and breeding status for the animal. For example, a nutritionally balanced dog food composition for puppies requires a protein content of between about 20% to about 50% by weight on a 90% dry matter basis. In one specific embodiment, a nutritionally balanced dog food composition for puppies includes between about 20% to about 30% protein content by weight on a 90% dry matter basis.

The farinaceous material may be defined as any material having a protein content of less than about 15% by weight and containing a substantial proportion of starches or carbohydrates, including grains such as corn, milo, alfalfa, wheat, soy hulls, and other grains having low protein content. In addition to the proteinaceous and farinaceous materials, other materials such as dried whey and other dairy byand other carbohydrates, may be added.

To make one embodiment of the dog food composition, the proteinaceous and farinaceous materials and additional desired materials, as chosen by availability and nutritional desirability, are combined to form an admixture, and a dietary methionine source is added and well blended throughout the admixture. The admixture is then transferred to a steam conditioner and subjected to steam and moisture to adjust the moisture content of the admixture to between about 20% and 40% by weight. The conditioned admixture is then extruded under conditions of elevated temperature and pressure to form a continuous strand of product. The product is segmented into discrete particles or pieces by a rotating cutting knife as the product is extruded. The particles or pieces are then conveyed to a forced air drying system and the moisture level is reduced to below about 10% by weight while the temperature of the particles or pieces is raised to about 140° F. The hot dried particles or pieces are then transferred by bulk conveyor to a spray chamber and dropped through the spray chamber. A plurality of spray heads located within the spray chamber, on both sides of the falling particles or pieces, spray a solution of animal fat onto the hot pieces or particles as they drop through the spray chamber.

The temperature of the pieces or particles within the forced air drying system may be adjusted to facilitate further processing. For example, a temperature of 140° F., as described above, facilitates coating of the pieces or particles with animal fat, where the melting point of the animal fat is below 140° F. The spray coated pieces or particles are collected at the bottom of the spray chamber and transported to a tumbling drum. The temperature of the tumbling drum is maintained above the melting point of the animal fat and the particles or pieces are tumbled until they have a substantially uniform surface coating of animal fat. The coated particles or pieces are then removed from the drum and cooled to ambient temperature. The resultant dry dog food composition has a moisture content of less than about 15% by weight, and a protein content between about 20% and about 30% by weight on a 90% dry matter basis.

Additionally, the methods and descriptions described herein for enhancing growth rates are applicable for production of semi-moist pet foods, which generally relate to a nutritionally balanced mixture of proteinaceous and farinaceous materials having a moisture content of from about 20% to about 50% by weight. One specific embodiment of semi-moist pet foods has a moisture content of about 27% to about 30%.

The pet food compositions described herein are not intended to be limited to a specific listing of ingredients because such ingredients will depend on such factors as, for example, the desired nutritional balance for the specific type of pet, and availability of ingredients to the manufacturer. In addition to the proteinaceous and farinaceous materials, semi-moist pet food compositions generally may include vitamins, minerals, and other additives such as flavorings, preservatives, emulsifiers and humectants. The nutritional balance, including the relative proportions of vitamins, minerals, fats, proteins and carbohydrates, are determined according to dietary standards known in the veterinary art.

While the invention has been described in terms of various specific embodiments, those skilled in the art will recognize that the invention can be practiced with modification within the spirit and scope of the claims.

What is claimed is:

1. A gender specific food for puppies, said food comprising:
   at least about 0.25% by weight methionine;
   at least about 0.45% by weight total sulfur amino acids; and
   a lipid level determined by a gender of the puppy to be fed.

2. A gender specific food according to claim 1 wherein for a male puppy, said food comprises methionine in a range from approximately 0.31% to approximately 0.83% by weight and approximately 0.50% to about 1.18% by weight total sulfur amino acids.

3. A gender specific food according to claim 2 wherein for a male puppy, said food comprises methionine in a range from approximately 0.41% to approximately 0.45% by weight and approximately 0.61% to about 0.80% by weight total sulfur amino acids.

4. A gender specific food according to claim 3 wherein for a male puppy, said food comprises approximately 0.45% by weight methionine and approximately 0.80% by weight total sulfur amino acids.

5. A gender specific food according to claim 2 wherein said dietary lipid level further comprises dietary fat in an amount which comprises less than about 25% of total calories of said food.

6. A gender specific food according to claim 1 wherein for a female puppy, said food comprises methionine in a range from approximately 0.25% to approximately 0.35% by weight and approximately 0.40% to about 0.70% by weight total sulfur amino acids.

7. A gender specific food according to claim 6 wherein for a female puppy, said food comprises methionine in a range from approximately 0.25% to approximately 0.30% by weight and approximately 0.45% to about 0.65% by weight total sulfur amino acids.

8. A gender specific food according to claim 6 wherein said dietary lipid level further comprises dietary fat in an amount which comprises more than about 25% of total calories of said food.

9. A gender specific food according to claim 1 further comprising a moisture basis less than about 15% by weight.

10. A gender specific food according to claim 1 further comprising a moisture basis from about 20% to about 50% by weight.

11. A gender specific food according to claim 10 further comprising a moisture basis from about 27% to about 30% by weight.

12. A method for increasing body weight gain and body length gain in puppies comprising the steps of:
   providing a diet with an amount of methionine and total sulfur amino acids based on a gender of the puppy; and
   formulating the diet with an amount of dietary calories from fat based on the gender of the puppy.

13. A method according to claim 12 wherein for a male puppy the amount of methionine in the diet is in a range of approximately 0.31% to approximately 0.83% by weight with total sulfur amino acids from approximately 0.50% to approximately 1.18% by weight.

14. A method according to claim 13 wherein for a male puppy the amount of methionine in the diet is in a range of approximately 0.41% to approximately 0.45% by weight with total sulfur amino acids from approximately 0.61% to approximately 0.80% by weight.

15. A method according to claim 14 wherein for a male puppy the amount of methionine in the diet is approximately 0.45% by weight with total sulfur amino acids of approximately 0.80% by weight.

16. A method according to claim 12 wherein for a male puppy the amount of dietary calories from fat in the diet is less than about 25%.

17. A method according to claim 12 wherein for a female puppy the amount of methionine in the diet is in a range of approximately 0.25% to approximately 0.35% by weight with total sulfur amino acids from approximately 0.45% to approximately 0.70% by weight.

18. A method according to claim 17 wherein for a female puppy the amount of methionine in the diet is in a range of approximately 0.25% to approximately 0.30% by weight with total sulfur amino acids from approximately 0.45% to approximately 0.65% by weight.

19. A method according to claim 12 wherein for a female puppy the amount of dietary calories from fat in the diet is more than about 30%.

20. A method according to claim 12 wherein a moisture basis in the diet is less than about 15% by weight.

21. A method according to claim 12 wherein a moisture basis in the diet is in a range from about 20% to about 50% by weight.

22. A food for male puppies comprising:
   from about 0.31% to about 0.83% by weight of an amino acid, methionine, as part of a total sulfur amino acids content of about 0.50% to about 1.18% by weight; and
   dietary fat in an amount which is less than about 25% of total calories contained in said food.

23. A food according to claim 22 wherein the amount of methionine is between approximately 0.41% and approximately 0.45% by weight and the total sulfur amino acids are about 0.61% to about 0.80% by weight.

24. A food according to claim 22 wherein the amount of methionine is approximately 0.45% by weight and the total sulfur amino acids are about 0.80% by weight.

25. A food according to claim 22 wherein the methionine content and the total sulfur amino acids content are obtained from a proteinaceous material which is between 20% and 50% by weight of said food.

26. A food for female puppies comprising:
   from about 0.25% to about 0.35% by weight of an amino acid, methionine, as part of a total sulfur amino acids of about 0.45% to about 0.70% by weight; and
   dietary fat in an amount which is more than about 25% of total calories contained in said food.

27. A food according to claim 26 wherein the amount of methionine is between approximately 0.25% and approximately 0.30% by weight and the total sulfur amino acids are about 0.45% to about 0.65% by weight.

28. A food according to claim 26 wherein the methionine content and the total sulfur amino acids content are obtained from a proteinaceous material which is between 20% and 50% by weight of said food.

29. A food for male puppies comprising:
   methionine in a range from approximately 0.31% to approximately 0.83% by weight, as part of a specified amount of total sulfur amino acids, and at least partially supplied by a proteinaceous material within said food; and
   dietary fat in an amount which is less than approximately 25% of total calories contained in said food.

30. A food according to claim 29 wherein the amount of methionine is between about 0.41% and about 0.45% by weight.

31. A food according to claim 29 wherein the amount of methionine is about 0.45% by weight.

32. A food according to claim 29 wherein the amount of proteinaceous material is between about 20% and 50% of said food by weight.

33. A food according to claim 32 wherein the amount of proteinaceous material is between about 20% and 30% of said food by weight.

34. A food for female puppies comprising:

methionine in a range from approximately 0.25% to approximately 0.35% by weight, as part of a specified amount of total sulfur amino acids, and at least partially supplied by a proteinaceous material within said food; and dietary fat in an amount which is more than about 25% of total calories contained in said food.

35. A food according to claim 34 wherein the amount of methionine is between about 0.25% and about 0.30% by weight.

36. A food according to claim 34 wherein the amount of proteinaceous material is between about 20% and 50% of said food by weight.

37. A food according to claim 36 wherein the amount of proteinaceous material is between about 20% and 30% of said food by weight.

38. A method for increasing body weight gain and body length gain in male puppies comprising the steps of:

including within the diet an amount of methionine in the diet between approximately 0.31% and approximately 0.83% by weight with total sulfur amino acids from approximately 0.50% to approximately 1.18% by weight; and formulating the diet with less than approximately 25% of dietary calories derived from fat.

39. A method for increasing body weight gain and body length gain in female puppies comprising the steps of:

including within the diet an amount of methionine in the diet between approximately 0.25% and approximately 0.35% by weight with total sulfur amino acids from approximately 0.45% to approximately 0.70% by weight; and formulating the diet with more than about 25% of dietary calories derived from fat.

* * * * *